March 9, 1943.

K. C. D. HICKMAN 2,313,546

DISTILLATION APPARATUS

Filed Nov. 19, 1940

KENNETH C.D. HICKMAN
INVENTOR

BY
ATTORNEYS

March 9, 1943.  K. C. D. HICKMAN  2,313,546
DISTILLATION APPARATUS
Filed Nov. 19, 1940  3 Sheets-Sheet 2

KENNETH C.D. HICKMAN
INVENTOR

BY
ATTORNEYS

March 9, 1943.　　　K. C. D. HICKMAN　　　2,313,546
DISTILLATION APPARATUS
Filed Nov. 19, 1940　　　3 Sheets-Sheet 3

KENNETH C.D. HICKMAN
INVENTOR

BY *Ultolm M Persus*
*Warren H. Cannon*
ATTORNEYS

Patented Mar. 9, 1943

2,313,546

UNITED STATES PATENT OFFICE 2,313,546

DISTILLATION APPARATUS

Kenneth C. D. Hickman, Rochester, N. Y., assignor to Distillation Products, Inc., Rochester, N. Y., a corporation of Delaware Application November 19, 1940, Serial No. 366,273
In Great Britain January 4, 1940

7 Claims. (Cl. 202—205)

This invention relates to improved fractionating stills and is particularly related to high vacuum, short path stills provided with means for fractionating the vapor with the minimum obstruction during its passage between the vaporizing and condensing surfaces thereof.

For efficient fractionation it is necessary to pass vapors being distilled into counter contact with reflux. Exchange of components takes place and if the interchange is conducted fully the vapors are finally obtained as a substantially pure substance. In order to obtain efficient interchange, intimate contact between reflux and vapors is necessary. This requires fractionating equipment offering high impedance to the vapors otherwise the columns must be of immense size. In either case large volumes of reflux are maintained at distilling temperature for a long period of time. If no consideration is given to the high cost of equipment this has not been particularly unsatisfactory for distillations at ordinary pressure. However, the equipment has been quite unsatisfactory for vacuum distillation particularly at low pressure. The distilling vapors must be developed under considerable pressure in order to force them through a long column containing numerous plates covered with reflux. This not only increases the pressure in the still but also increases thermal decomposition. Also the large volume of liquid maintained at distillation temperature in the column was a great cause of decomposition, since substances usually distilled under vacuum conditions are relatively unstable at elevated temperatures.

This invention has for its object to provide relatively simple and economical fractional distillation apparatus. Another object is to provide fractional distillation apparatus which avoids the above difficulties. A still further object is to provide fractional distillation apparatus in which intimate and thorough contact between reflux and vapors takes place in a short space of time and in simple apparatus. A further object is to provide fractional distillation apparatus in which the amount of reflux is maintained at a low volume. A further object is to provide high vacuum fractional distillation apparatus which reduces pressure drop to a large extent. Other objects will be apparent from the following detailed description.

These and other objects are accomplished in accordance with my invention which includes a high vacuum fractionating still provided with lagging which can be rotated in such a manner that, during rotation, reflux collecting thereon is caused to flow by centrifugal action in a direction approximately counter to that of the vapors passing through the lagging to the condenser and provided with vaporizing and condensing surfaces which are separated by substantially unobstructed space except for the space occupied by the lagging.

In the following description I have set forth several of the preferred embodiments of my invention. However, it is to be understood that these are given for the purpose of illustration and not in limitation thereof.

In the accompanying drawings wherein like numbers refer to like parts:

Figure 1:
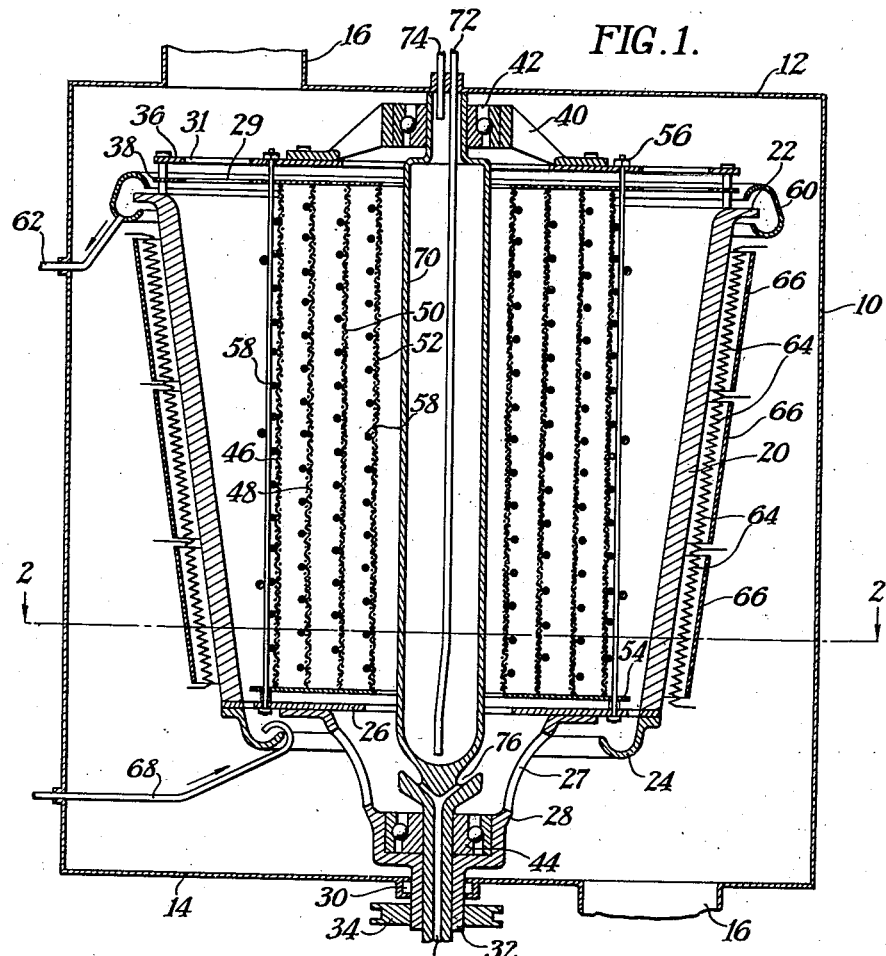
Fig. 1 is an elevation in section of a high vacuum still provided with rotatable reflux assembly intermediate the vaporizing and condensing zones.
Figure 2:
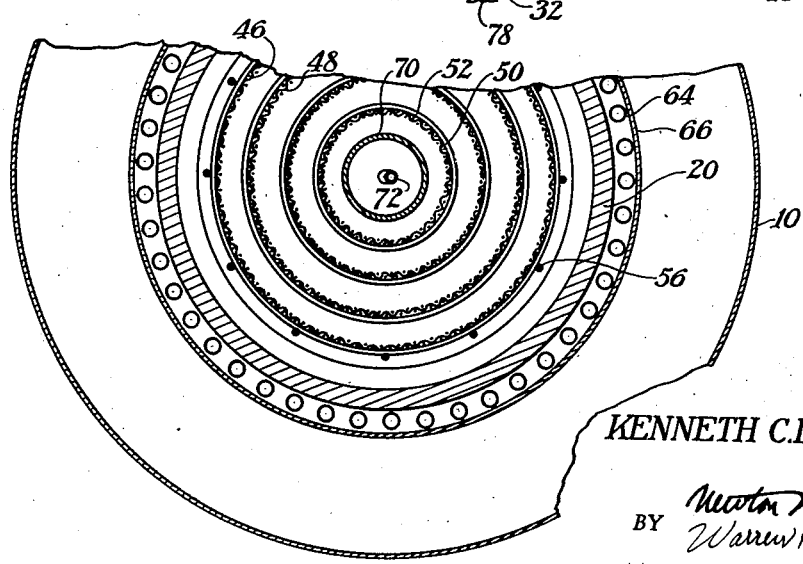
Fig. 2 is a horizontal section taken on lines 2—2 of Fig. 1.

Referring to Figs. 1 and 2, numeral 10 designates a cylindrical casing closed by plates 12 and 14 at the base and top thereof. Numeral 16 designates evacuating conduits which are connected to vacuum pumps. Numeral 20 designates a truncated cone constructed of heat conducting material which is provided with a flared flange 22 at the top and with an inwardly turned gutter 24 at the base. The base portion of the cone is integral with an inwardly extending plate 26 which is in turn integral with mounting 28 which extends through a packed gland 30 to form a drive shaft 32 upon which is mounted pulley 34. The top portion of truncated cone 20 is integral with plates 36 and 38 which are in turn integral with housing or mounting 40 which is supported by bearing 42 and shaft 44. Numerals 27, 29 and 31 designate openings in elements 28, and plates 38 and 36 respectively.

Numerals 46, 48, 50 and 52 designate a plurality of concentric cylinders constructed of metal gauze which are rigidly maintained in the position shown by welding the ends thereof to supporting end plates 38 and 54. The entire system of cylindrical gauzes is maintained in the position shown by bolts 56 and circular wire rings 58. Numeral 60 designates an annular split gutter into which extends flange 22. Numeral 62 designates a withdrawal conduit connected to gutter 60. Numeral 64 designates electrical resistance heating units and numeral 66 designates brightly polished reflectors. Numeral 68 designates a conduit which terminates inside gutter 24. Numeral 70 designates a cylindrical condensing surface which is restricted at the top and base portion thereof to form a stationary axis upon which is mounted bearings 42 and 44. Numerals 72 and 74 designate conduits for introducing cooling fluid into the inside portion of the condenser. Numeral 76 designates a gutter at the lower portion of the condensing tube 70 and numeral 78 designates a conduit which connects to gutter 76.

Figure 3:
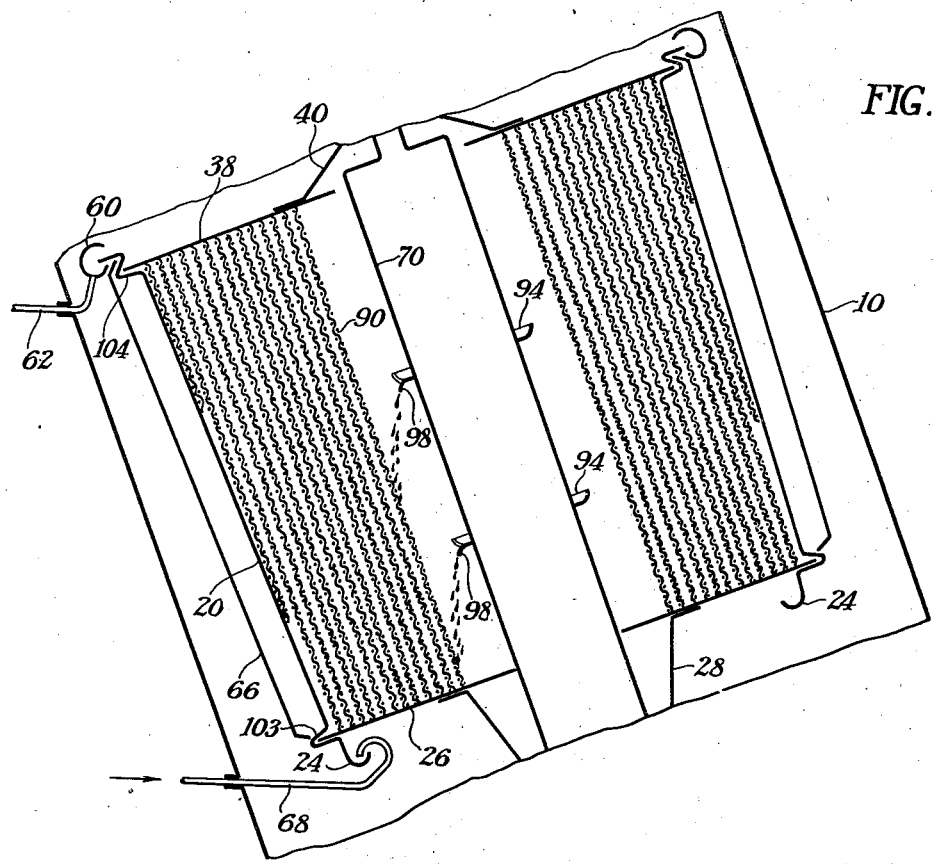
Fig. 3 is a diagrammatic partial vertical section of a modification of the apparatus illustrated in Figs. 1 and 2.
Figure 4:
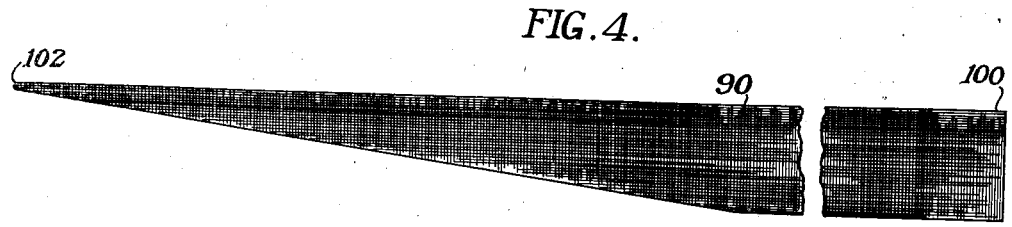
Fig. 4 illustrates the form of the gauze used to construct the reflux assembly in Fig. 3.

Referring to Figs. 3 and 4, numeral 90 designates a metal gauze packing located between the vaporizing surface 20 and the condensing surface 70. Numerals 26 and 38 designate end plates which retain the gauze packing 90 in position. This still is designed for distillation at relatively elevated pressures and for that reason plates 26 and 38 are unperforated. This permits the elimination of casing 10, if desired. Furthermore, with this construction, the distilling surface 20 can be exposed to the air and be heated by direct application of a gas flame, hot combustion gases, or hot fluids of one kind or another. Since plates 26 and 38 are non-perforated they serve to prevent escape of distilling vapors. Also they act as a still wall. Numeral 94 designates gutters integral with condenser 70 each of which is provided with an exit lip 98 at the lower portion thereof. The entire still assembly illustrated in Fig. 3 is mounted at an angle in the manner illustrated. Fig. 4 illustrates the gauze packing 90 and its mode of construction. The gauze is rolled into a cylinder starting at the end 100 and terminating at 102. In other words, when the gauze is rolled into a cylinder the end 102 is on the outside. The tapered end will terminate at the top of the rolled cylinder and accordingly will fit inside the vaporizing cone 20 in a snug manner.

The problem of introducing liquid into the closed rotating chamber made up of cone 20 and end plates 26 and 28 is overcome by forming annular rings 103 and 104 in the ends of distilling cone 20 into which extends plates 26 and 38, respectively. These plates fit into the annular channels in such a manner as to permit liquid to pass therethrough. However, the clearance is sufficiently small that the liquid effectively seals the distilling chamber and prevents passage of vapors. The liquid is forced through the narrow space by centrifugal force.

Figure 5:
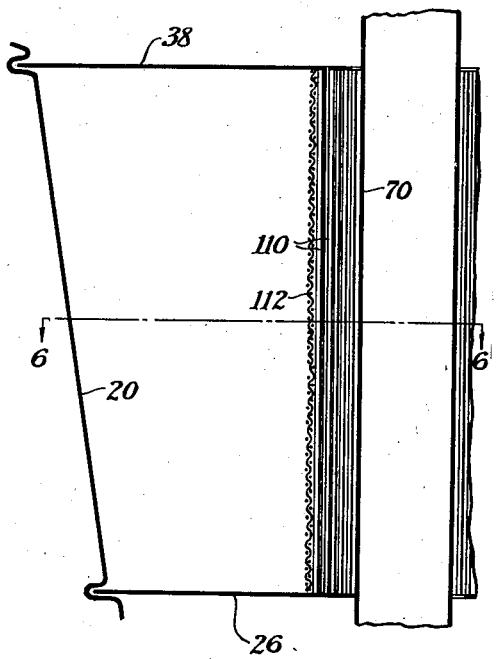
Fig. 5 is a diagrammatic partial vertical section of a further modification similar to that illustrated in Fig. 3.
Figure 6:
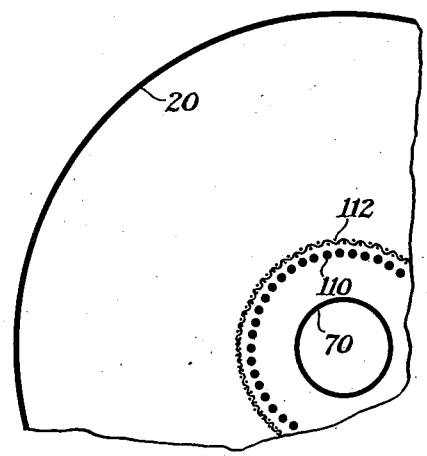
Fig. 6 is a fragmentary horizontal section taken on line 6—6 of Fig. 5.

Referring to Figs. 5 and 6, numeral 110 designates a plurality of rods located in fairly close proximity to condenser 70. These rods are in the form of a cylinder. Numeral 112 designates a cylinder of metal gauze coaxial with the cylinder of rods 110 and condenser 70.

Figure 7:
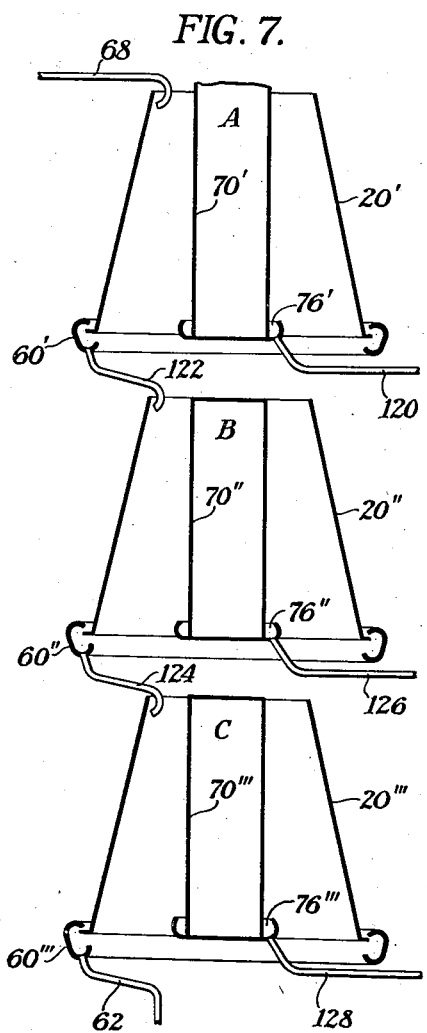
Fig. 7 is a diagrammatic elevation in section of a plurality of stills connection in series.

Referring to Fig. 7, numerals A, B, and C designate three different stills connected in series. Each of these stills may be constructed in accordance with the details illustrated in the previous figures. However, the vaporizing cones 20', 20'', and 20''', are inverted and the material to be distilled is introduced at the top and undistilled residue is removed at the bottom. Numeral 68 designates a conduit for introducing liquid onto the top portion of vaporizing cone 20'. Numeral 60' designates a gutter for collecting undistilled residue. Numeral 120 designates a conduit for removal of the first fraction. Numeral 122 designates a conduit for removing undistilled residue from gutter 60' and delivering it onto the top of vaporizing cone 20''. Numeral 60'' designates a gutter for collecting undistilled residue from still B. Numeral 124 designates a conduit for conveying this undistilled residue onto the top of vaporizing surface 20'''. Numeral 126 designates a conduit for removing a distillate from still B. Numeral 62 designates the conduit for removing undistilled residue from gutter 60''' and numeral 128 designates a conduit for removing the fraction separated in still C.

In operating the apparatus of Figs. 1 and 2, power is applied to pulley 34 and the assembly consisting of housings 28 and 40, bearings 42 and 44, truncated cone 20, cylindrical concentric gauzes 46, 48, 50 and 52, end plates 38 and 36, etc. all rotate as one integral unit. Material to be distilled is introduced through conduit 68 into gutter 24. Due to centrifugal force, this liquid is drawn up the inside wall of truncated cone 20. This cone is heated to distillation temperature by electricity passing through resistance units 64. Undistilled residue is thrown into gutter 60 and is withdrawn through conduit 62. Vapors derived from surface 20 pass in sequence through the concentric gauze cylinders 46, 48, 50 and 52. Vapors surviving this passage are condensed upon condenser 70, flow by gravity into gutter 76 and are withdrawn from the still through conduit 78. Gases present in the still pass through openings 27, 29, and 31 and thence into conduits 16.

During the passage of the vapors between vaporizing surface 20 and condensing surface 70, part of the vapors, which will be the lowest vapor pressure components, are condensed upon the gauze cylinders. This liquid condensate is thrown by centrifugal force in a reverse direction to the direction in which the vapors flow. Therefore, there is efficient interchange between vapor and liquid resulting in efficient fractionation. The lowest vapor pressure components are thrown from the outside gauze cylinder 46 back onto the vaporizing surface 20, where the evaporation of the lightest components thereof may take place.

In the apparatus illustrated in Fig. 1 the fractionating lagging is shown as being formed of a plurality of concentric wire gauzes rigidly held in the position shown. These act as separate and distinct fractionating plates. The number can be increased or decreased as desired and in accordance with the degree of fractionation contemplated. Instead of wire gauzes, the fractionating plates or zones may be made up of patterns of rods which may be streamlined in the direction in which the vapors and condensate flow therethrough. Patterns of strips may likewise be used.

In operating the apparatus of Fig. 3, the still is evacuated if the operation is to be carried out under reduced pressure in which case plates 26 and 38 must be perforated. Vaporizing surface 20 is heated to distillation temperature, the unit is caused to rotate, and distilland is introduced through conduit 68. The liquid distilland flows from gutter 24 upward through the clearance between plate 26 and recessed flange 102. The liquid distilland then flows in a thin film over the inside surface of cone 20 and finally passes through recess 104 and is flung into gutter 60. During passage over heated surface 20, vapors are generated and passed through the gauze packing 90. Heavier portions of the vapors condense on the gauze 90 and are flung in opposite direction by centrifugal force as described in connection with Fig. 1. The lighter portion of the vapors are condensed on condenser 70. These portions flow down the surface by gravity and are collected in gutter 94. This condensate is then caused to flow by gravity from the exit lip 98 of the upper gutter 94 and falls onto the gauze 90 which is rotating. This liquid condensate is then refractionated and recondensed at a lower point on condenser 70. This recondensed fraction is again returned to the gauze by way of the second gutter 94 and again refractionated. The final fraction collected on the lowest portion of condenser 70 represents a fraction which has been repeatedly refractionated and is, therefore, quite pure. This refractionation can be adjusted and varied by using different numbers of collecting gutters 94 and by locating them at appropriate positions. If a large number of gutters 94 are provided, there is a return of reflux in infinitesimal steps or amounts and the fractionation approaches ideal conditions.

Figs. 5 and 6 illustrate the simplest form of fractionating device embodying the principles of my invention. Instead of having the entire space between the condenser and vaporizing surface packed with lagging, there is merely provided sufficient fractionating surfaces to cause partial condensation of the vapors. Thus, rods 110 and gauze 112 are sufficient to cause part of the condensate to condense thereon. This condensate is then flung in the form of small droplets through the space between 112 and vaporizing surface 20. During this passage these droplets come into contact with the vapors passing in the opposite direction. This gives very efficient spray washing of the vapor without the complication of a mechanical filling. With this apparatus no still casing 10 is shown and it is contemplated that the vaporizing surface 20 be exposed to the atmosphere and to be heated by any suitable means. This permits the use of cheap heating means such as combustion gases from a coal furnace or gas flames. The apparatus shown in Figs. 3 and 5 can be used to distill under vacuum if end plates 26 and 38 are perforated and the entire assembly enclosed in a gas-tight casing.

In the apparatus shown in the foregoing figures, the distilland is introduced at the bottom and flows by centrifugal force to the top. This has the disadvantage of requiring long conduits with cooling of undistilled residue when a plurality of stills are employed in series. This difficulty is overcome by the construction shown in Fig. 7. In this apparatus liquid to be distilled is introduced through conduits 68, and flows downward by a combination of centrifugal force and gravity. Undistilled residue collects in 60', flows through conduit 122 and thence onto vaporizing surface 20''. Undistilled residue from still B is introduced onto vaporizing surface 20''' by way of gutter 124. Fractions condensing on the condensing surface 70', 70'', and 70''', are removed therefrom by conduits 120, 126, and 128, respectively. It will be noticed that conduits 122 and 124 which serve to convey undistilled residue from one still to another are short and consequently do not necessitate holding large volumes of heated liquid in an exposed condition where it would be cooled before being introduced onto the next still of the series. All of the rotating cones shown in Fig. 7 can be mounted on the same shaft. Also the entire series of stills can be enclosed in a single gas tight casing.

It is unnecessary to employ definite patterns or groups of gauze, rods, strips or other packing material so as to form individual plates. The entire fractionating zone may be filled in a haphazard manner with lagging of any kind generally employed for this purpose, for instance Raschig rings, jacks, Lessing rings, jack chain, or glass beads may be used. The character of the lagging will depend upon the type of distillation to be carried out in the still. For distillation at ordinary pressures the amount of obstruction is not so important and the size of the individual units making up the packing may be small. For vacuum, and particularly for high vacuum unobstructed path distillation, the lagging should be sufficiently coarse in structure that small obstruction is offered to the flow of vapor therethrough. The lagging may be arranged in separate and distinct units in the manner illustrated in connection with the gauze of Fig. 1. When a filling material, such as rings, jacks, or beads are to be used in this manner, the individual plates can be constructed by forming the outside surfaces thereof of a material such as gauze or retaining rods and filling the intervening space with the filling material.

In the specification and claims it is to be understood that the term "lagging" applies to these various forms of fractionating elements whether employed as one body or as separate and distinct units and whether in the form of gauze plates or in the form of individual plates constructed of small units filled into spaces between retaining walls.

The temperature of the fractionating plates or zones can be controlled and varied as in the prior art. This can be accomplished by spraying cold condensate onto the particular zone to be cooled or it may be warmed by the direct application of heated condensate, electricity, or by magnetic induction, etc. Reflux may be withdrawn from any particular plate and reintroduced into the still at another point to improve fractionation in known manner. Furthermore, an intermediate distillate may be collected in this manner if desired.

Although I have found it convenient to illustrate my invention in connection with a high vacuum still, my improved apparatus is satisfactory for distillation at ordinary pressures or even at superatmospheric pressure if desired. This is particularly the case where channeling of the reflux is otherwise encountered; under the action of centrifugal force the reflux seeks the most direct and hence the most uniform path. However, the invention is of exceedingly great value for high vacuum fractionation since it combines good distribution of reflux with the minimum pressure drop and requires that only a small amount of liquid be heated at one time. Also the use of a centrifugal vaporizer such as illustrated in the drawings is not a prerequisite. Other methods of obtaining the vapors may be used. For instance, the vaporizing cone shown in Fig. 1 could be stationary and the distilland introduced at the top thereof, permitted to flow thereover by gravitational force and be withdrawn from the base.

A modification which will be found to be of value where the formation of a spray is undesired is a wire gauze or porous plate in the form of a spiral. The centrifugal force causing the reflux to pass over the surface from the center to the periphery thereof. However, the passage takes place by the flow of liquid over the surface rather than by the flinging of liquid from one plate to another. This construction gives efficient contact with vapor flowing in an opposite direction but is not as efficient as the constructions illustrated as far as efficiency of interchange is concerned. However, it does solve the problem of entrainment.

The speed of rotation of the fractionating lagging should preferably be between about 50 and 30,000 rotations per minute. However, it will be understood that these are preferred values and that my invention is not limited thereto, it being contemplated that lower or higher speeds of rotation will be used under unusual circumstances or for distilling particular substances. Rates of rotation of between 200 and 3,000 R. P. M. have been found to be satisfactory for conditions and substances most generally encountered.

A particular advantage of my invention is that the fractionating zone is maintained comparatively empty of reflux. This avoids back pressure as well as decomposition as a result of heating large amounts of condensate to distillation temperature. Exceedingly efficient and intimate contact between reflux and distilling vapors also takes place. This results in efficient fractionation. Furthermore, the constructions shown in the drawings have the advantage that conservation of heat takes place, since only a relatively small internal area is exposed for cooling.

The direction of flow of vapors need not be exactly opposite to that of reflux although this is preferred. It is contemplated that any direction which is in general opposite to that of the whorled reflux, such as a direction oblique thereto, can be used. The term "approximately counter" shall be understood to apply to the foregoing conditions.

What I claim as new and desire to be secured by Letters Patent of the United States is:

1. A fractionating still adapted to fractionate by passage of the distilling vapors through lagging located intermediate the vapor source and the condenser whereby reflux passes through the lagging in a direction approximately counter to that of the vapors, said still comprising a rotatable conical vaporizing surface, means for heating the vaporizing surface, means for introducing distilland onto the inside of the conical surface at a point near its smallest diameter, means for removing undistilled residue from the conical surface at a point near its largest diameter, a condenser located within the cone, means for cooling the condenser, means for removing condensate from the condenser, lagging located intermediate the vaporizing surface and the condenser and rotatably mounted so that during rotation thereof reflux collecting thereon is caused to flow by centrifugal force in a direction counter to that of the vapors passing through the lagging to the condenser.

2. A high vacuum fractionating still adapted to fractionate by countercurrent passage of distilling vapors with reflux in a body of lagging positioned intermediate the vaporizer and condenser, said high vacuum fractionating still being characterized by a vaporizing surface and a condensing surface located within a still casing and separated by substantially unobstructed space except for the lagging therebetween, means for cooling the condensing surface, means for heating the vaporizing surface, an evacuating port for removing gases from the still casing and rotatable lagging so positioned between the vaporizing and condensing surfaces that vapors passing from the vaporizing to the condensing passing surface must pass therethrough, and so positioned that during rotation liquid collecting thereon is caused to flow by centrifugal force in a direction approximately counter to that of the vapors passing from the vaporizing surface to the condensing surface.

3. A high vacuum fractionating still adapted to fractionate by countercurrent passage of distilling vapors with reflux in a body of lagging positioned intermediate the vaporizer and condenser, said high vacuum fractionating still being characterized by a vaporizing surface and a condensing surface located within a still casing and separated by substantially unobstructed space except for the lagging therebetween, means for cooling the condensing surface, means for heating the vaporizing surface, an evacuating port for removing gases from the still casing and rotatable lagging which does not substantially obstruct the flow of vapors to the condensing surface, which is so positioned between the vaporizing and condensing surfaces that vapors passing from the vaporizing to the condensing surface must pass therethrough, and which is so positioned that during rotation liquid collecting thereon is caused to flow by centrifugal force in a direction approximately counter to that of the vapors passing from the vaporizing surface to the condensing surface.

4. A high vacuum fractionating still adapted to fractionate by countercurrent passage of distilling vapors with reflux in a body of lagging positioned intermediate the vaporizer and condenser, said high vacuum fractionating still being characterized by a rotatable vaporizing surface over which distilland is caused to flow in a thin film by centrifugal force, a condensing surface, both of said surfaces being located within a still casing and separated by substantially unobstructed space except for the lagging therebetween, means for cooling the condensing surface, means for heating the vaporizing surface, an evacuating port for removing gases from the still casing and rotatable lagging so positioned between the vaporizing and condensing surfaces that vapors passing from the vaporizing to the condensing surface must pass therethrough, and so positioned that during rotation liquid collecting thereon is caused to flow by centrifugal force in a direction approximately counter to that of the vapors passing from the vaporizing surface to the condensing surface.

5. A high vacuum fractionating still adapted to fractionate by countercurrent passage of distilling vapors with reflux in a body of lagging positioned intermediate the vaporizer and condenser, said high vacuum fractionating still being characterized by a rotatable vaporizing surface over which distilland is caused to flow in a thin film by centrifugal force and a condensing surface both of said surfaces being located within a still casing and separated by substantially unobstructed space except for the lagging therebetween, means for cooling the condensing surface, means for heating the vaporizing surface, an evacuating port for removing gases from the still casing and rotatable lagging having large apertures so positioned between the vaporizing and condensing surfaces that vapors passing from the vaporizing to the condensing surface must pass therethrough, and so positioned that during rotation liquid collecting thereon is caused to flow by centrifugal force in a direction approximately counter to that of the vapors passing from the vaporizing surface to the condensing surface.

6. A high vacuum fractionating still adapted to fractionate by countercurrent passage of distilling vapors with reflux in a body of lagging positioned intermediate the vaporizer and condenser, said high vacuum fractionating still being characterized by a vaporizing surface and a condensing surface located within a still casing and separated by substantially unobstructed space except for the lagging therebetween, means for cooling the condensing surface, means for heating the vaporizing surface, an evacuating port for removing gases from the still casing, rotatable lagging so positioned between the vaporizing and condensing surfaces that vapors passing from the vaporizing to the condensing surface must pass therethrough, and so positioned that during rotation liquid collecting thereon is caused to flow by centrifugal force in a direction approximately counter to that of the vapors passing from the vaporizing surface to the condensing surface, and means for maintaining individual portions of the lagging at different temperatures.

7. A high vacuum fractionating still adapted to fractionate by countercurrent passage of distilling vapors with reflux in a body of lagging positioned intermediate the vaporizer and condenser, said high vacuum fractionating still being characterized by a rotatable vaporizing surface and a condensing surface located within the still casing and separated by substantially unobstructed space except for lagging therebetween, means for cooling the condensing surface, means for heating the vaporizing surface, an evacuating port for removing gases from the still casing and highly porous lagging attached to the rotatable vaporizing surface and rotating therewith, said lagging being so positioned between the vaporizing and condensing surfaces that vapors passing from the vaporizing to the condensing surface must pass therethrough, and so positioned that during rotation liquid collecting thereon is caused to flow by centrifugal force in a direction approximately counter to that of the vapors passing from the vaporizing surface to the condensing surface.

KENNETH C. D. HICKMAN.